US011731614B2

(12) United States Patent
Choi et al.

(10) Patent No.: US 11,731,614 B2
(45) Date of Patent: Aug. 22, 2023

(54) APPARATUS AND METHOD FOR CONTROLLING VEHICLE TO AVOID OR MITIGATE COLLISION

(71) Applicant: HL KLEMOVE CORP., Incheon (KR)

(72) Inventors: JongHwan Choi, Gyeonggi-do (KR); Tae Seok Kang, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 185 days.

(21) Appl. No.: 16/043,113

(22) Filed: Jul. 23, 2018

(65) Prior Publication Data

US 2019/0031190 A1   Jan. 31, 2019

(30) Foreign Application Priority Data

Jul. 25, 2017 (KR) .................. 10-2017-0094393
Jul. 25, 2017 (KR) .................. 10-2017-0094395

(51) Int. Cl.
*B60W 30/09* (2012.01)
*B60W 30/18* (2012.01)
(Continued)

(52) U.S. Cl.
CPC ............ *B60W 30/09* (2013.01); *B60W 10/10* (2013.01); *B60W 30/095* (2013.01);
(Continued)

(58) Field of Classification Search
CPC . B60W 30/08–0956; B60W 30/18163; B60W 2554/802; B60W 2554/804;
(Continued)

(56) References Cited

U.S. PATENT DOCUMENTS 5,483,453 A * 1/1996 Uemura ............... G05D 1/0246
                                                                180/179
8,886,437 B2 * 11/2014 Dickinson ............. F02D 41/123
                                                                701/93
(Continued)

FOREIGN PATENT DOCUMENTS

DE       102005001929 A1 * 8/2005  .............. B60K 1/00
DE       10 2015 217 498           3/2017
(Continued)

OTHER PUBLICATIONS

Kanter—English description of WO-2013083343-A1, via Espacenet Patent Translate on Apr. 6, 2020 (Year: 2020).*

(Continued)

*Primary Examiner* — Jeffrey C Boomer
*Assistant Examiner* — Paul Allen
(74) *Attorney, Agent, or Firm* — Ladas & Parry, LLP

(57) ABSTRACT

An apparatus and a method for controlling a vehicle calculate a distance from a following vehicle and a relative speed of the following vehicle, if the following vehicle is detected on the rear side of a host vehicle based on detection information received from a detection module detecting an object around the host vehicle, determine a probability of a potential collision of the following vehicle with the host vehicle based on the distance from the following vehicle and the relative speed of the following vehicle, and accelerate or decelerate a traveling speed of the host vehicle, or adjust brake torque of the host vehicle, if the potential collision of the following vehicle with the host vehicle is predicted. When a probability of a potential collision with the following vehicle is predicted, injuries to a driver and occupants can be prevented or reduced.

11 Claims, 10 Drawing Sheets

(51) Int. Cl.

| | |
|---|---|
| *B60W 30/095* | (2012.01) |
| *G08G 1/16* | (2006.01) |
| *G01S 13/931* | (2020.01) |
| *G01S 13/87* | (2006.01) |
| *G01S 13/86* | (2006.01) |
| *G01S 17/931* | (2020.01) |
| *G01S 13/93* | (2020.01) |
| *B60W 10/10* | (2012.01) |

(52) U.S. Cl.
CPC ....... *B60W 30/18163* (2013.01); *G08G 1/167* (2013.01); *B60W 2554/801* (2020.02); *G01S 13/867* (2013.01); *G01S 13/87* (2013.01); *G01S 13/93* (2013.01); *G01S 17/931* (2020.01); *G01S 2013/932* (2020.01); *G01S 2013/9318* (2020.01); *G01S 2013/9319* (2020.01); *G01S 2013/9321* (2013.01); *G01S 2013/9323* (2020.01); *G01S 2013/9324* (2020.01); *G01S 2013/93185* (2020.01); *G01S 2013/93271* (2020.01); *G01S 2013/93272* (2020.01); *G01S 2013/93274* (2020.01); *G08G 1/166* (2013.01)

(58) Field of Classification Search
CPC ........... B60W 2030/082; B60W 30/12; B60W 30/14–17; B60W 2720/10–106; B60W 10/10; B60W 30/09; B60W 30/095; B60W 2554/801; B60W 2520/10; B60W 2554/00; B60W 2554/80; B60W 2556/50; B60W 10/04; B60W 10/18; B60W 10/20; B60W 30/0953; G05D 1/0214; G05D 1/0223; G05D 1/0088; B62D 15/0255; G01S 2013/93185; G01S 2013/9319; G01S 2013/932; G01S 2013/9321; G01S 2013/9323; G01S 2013/9324; G01S 2013/93271; G01S 2013/93272; G01S 2013/93274; G01S 13/867; G01S 13/87; G01S 13/93; G01S 17/931; G01S 2013/9318; G08G 1/167; G08G 1/166
USPC .......................................... 701/23–28, 93–98
See application file for complete search history.

(56) References Cited

U.S. PATENT DOCUMENTS

| | | | | |
|---|---|---|---|---|
| 2001/0044690 | A1* | 11/2001 | Flammersfeld | B60K 31/042 701/93 |
| 2002/0111735 | A1* | 8/2002 | McKenzie | B60K 31/18 701/115 |
| 2005/0015203 | A1* | 1/2005 | Nishira | B60W 50/16 701/301 |
| 2010/0010723 | A1* | 1/2010 | Taki | B60W 30/08 701/102 |
| 2012/0277957 | A1* | 11/2012 | Inoue | G08G 1/167 701/41 |
| 2015/0191170 | A1* | 7/2015 | Johansson | B60K 31/00 701/94 |
| 2016/0097853 | A1* | 4/2016 | Kamo | G01S 13/584 342/70 |
| 2016/0176401 | A1* | 6/2016 | Pilkington | B60W 30/146 701/93 |
| 2016/0207530 | A1* | 7/2016 | Stanek | B60W 30/09 |
| 2016/0240084 | A1* | 8/2016 | Takeuchi | G08G 1/165 |
| 2016/0272204 | A1* | 9/2016 | Takahashi | B60W 30/16 |
| 2016/0347175 | A1* | 12/2016 | Yamashita | B60K 31/0008 |
| 2016/0347241 | A1* | 12/2016 | Gralto | G06Q 90/00 |
| 2017/0129466 | A1* | 5/2017 | Okubo | B60T 7/12 |
| 2017/0129501 | A1* | 5/2017 | Lee | B60W 30/16 |
| 2017/0242435 | A1* | 8/2017 | Nilsson | B60W 30/16 |
| 2018/0057002 | A1* | 3/2018 | Lee | B60W 60/00276 |
| 2018/0370527 | A1* | 12/2018 | Rachor | B60W 50/14 |
| 2019/0011916 | A1* | 1/2019 | Alvarez Rodriguez | B60R 1/00 |
| 2019/0047571 | A1* | 2/2019 | Ulbrich | B60W 30/18163 |
| 2020/0039508 | A1* | 2/2020 | Onishi | G08G 1/16 |

FOREIGN PATENT DOCUMENTS

| | | | | |
|---|---|---|---|---|
| JP | 2000-355273 | | 12/2000 | |
| JP | 2001-122094 | | 5/2001 | |
| JP | 2003-106859 | | 4/2003 | |
| JP | 2003106859 | A * | 4/2003 | |
| JP | 2005-113760 | | 4/2005 | |
| JP | 2006082644 | A * | 3/2006 | ............ B60W 30/09 |
| JP | 2006-160205 | | 6/2006 | |
| JP | 2007-230500 | | 9/2007 | |
| JP | 2008-80845 | | 4/2008 | |
| JP | 2016-168985 | | 9/2016 | |
| JP | 2016-181226 | | 10/2016 | |
| KR | 10-2015-0044134 | | 4/2015 | |
| KR | 10-2017-0054797 | | 5/2017 | |
| KR | 10-2017-0068062 | | 6/2017 | |
| WO | 2013/083343 | | 6/2013 | |
| WO | WO-2013083343 | A1 * | 6/2013 | ............ B60W 30/09 |

OTHER PUBLICATIONS

Nishisaka—English description of JP-2006082644-A via Espacenet Patent Translate on Apr. 6, 2020 (Year: 2020).*
Kubota—English description of JP-2003106859-A via Espacenet Patent Translate on Apr. 10, 2020 (Year: 2020).*
Engelke P—English Translation of DE-102005001929-A1 via Espacenet Patent Translate, retrieved Jul. 25, 2022. (Year: 2022).*
Office Action dated Jan. 2, 2019 for Korean Patent Application No. 10-2017-0094393 and its English translation by Google Translate.
Office Action dated Jan. 2, 2019 for Korean Patent Application No. 10-2017-0094395 and its English translation by Google Translate.
Office Action dated Oct. 8, 2022 for Chinese Patent Application No. 201810881968.8 and its English translation from Global Dossier.

* cited by examiner

APPARATUS AND METHOD FOR CONTROLLING VEHICLE TO AVOID OR MITIGATE COLLISION

CROSS-REFERENCE TO RELATED APPLICATION

This application claims the priority benefit of Korean Patent Application No. 10-2017-0094395, filed on Jul. 25, 2017 and No. 10-2017-0094393, filed on Jul. 25, 2017 in the Korean Intellectual Property Office, the disclosures of which are incorporated herein by reference in their entirety.

BACKGROUND

1. Field of the Disclosure

The present disclosure relates to an apparatus and a method for controlling a vehicle and more particularly to a vehicle control apparatus and method for detecting a following vehicle and then avoiding or mitigating a collision with the following vehicle or conceding an overtaking lane to the following vehicle initiating a lane change into the overtaking lane.

2. Description of the Background

As the use of vehicles rapidly grows in modern society, the number of deaths and injuries caused by car accidents has reached tens of millions of people every year. Accordingly, in order to reduce personal injury and economic loss caused by traffic accidents, there have been developed numerous automobile technologies, such as an advanced driver assistance system (ADAS) that prevents accidents with advanced sensors and intelligent image equipment, or the like.

Such an ADAS includes a forward collision warning (FCW) system, an automatic cruise control (ACC) system, a lane change assistance system, a lane departure warning system, a blind spot detection system and a parking assistance system, or the like.

Among these systems, the automatic cruise control system is referred to as a smart cruise control system, and enables a host vehicle to automatically detect a preceding vehicle in the same direction in front of the host vehicle while maintaining the currently traveling lane by a driver's setting, and to automatically travel at a target speed while maintaining a safety distance from the preceding vehicle by automatically accelerating or decelerating according to the speed of the preceding vehicle.

Meanwhile, there often occur collisions caused by a following vehicle while a vehicle is traveling, and there often are cases where drivers do not prevent collision with the following vehicle because the drivers look ahead rather than the following vehicle. In a case where the blind spot detection system is used, it is possible to detect the following vehicle and predict the collision with the following vehicle. Thus, it is required to provide an apparatus, system or method for, as well as detecting a probability of a potential collision with the following vehicle, when the potential collision with the following vehicle is predicted, avoiding a collision with the following vehicle or minimizing the impact generated in the collision when it is unavoidable. In addition, it is necessary to control vehicle's traveling so that the vehicle appropriately concedes to a following vehicle initiating a lane change into an overtaking lane while the vehicle is traveling on the first lane, which is the overtaking lane, on the highway.

SUMMARY

Accordingly, the present disclosure provides an apparatus and a method for controlling a vehicle having a rear-side-impact mitigating function of avoiding a potential collision with a following vehicle or mitigating the impact generated in the collision, when the potential collision with the following vehicle is predicted.

In addition, the present disclosure provides an apparatus and a method for controlling a vehicle having a lane change function of conceding an overtaking lane to a following vehicle initiating a lane change into the overtaking lane while the vehicle is traveling in the overtaking lane.

In accordance with an aspect of the present disclosure, provided is a vehicle control apparatus including a vehicle information acquisition module configured to calculate a distance from a following vehicle and a relative speed, if the following vehicle located on the rear side of a host vehicle is detected, based on detection information received from a detection module detecting objects around the host vehicle, a collision prediction module configured to predict or determine a probability of a potential collision of the following vehicle with the host vehicle, using the distance and the relative speed from the vehicle information acquisition module, and a controller configured to accelerate or decelerate a traveling speed of the host vehicle, or adjust brake torque of the host vehicle, if the potential collision with the following vehicle is predicted.

In accordance with another aspect of the present disclosure, provided is a vehicle control method including detecting objects around a host vehicle, calculating a distance from a following vehicle and a relative speed, if the following vehicle located on the rear side of the host vehicle is detected, predicting or determining a probability of a potential collision of the following vehicle with the host vehicle, using the distance and the relative speed from the vehicle information acquisition module, and accelerating or decelerating a traveling speed of the host vehicle, or adjusting brake torque of the host vehicle, if the potential collision with the following vehicle is predicted.

In accordance with a vehicle control apparatus and a method of the present disclosure, a collision with a following vehicle can be avoided or the impact generated in the collision can be mitigated, by accelerating or decelerating a speed of a host vehicle, or adjusting braking pressure of the host vehicle if the potential collision with the following vehicle is predicted, and thereby prevent or reduce injury to the driver and occupants.

In addition, in accordance with a vehicle control apparatus and a method of the present disclosure, the convenience for a following vehicle can be provided and the traffic congestion can be prevented, by conceding an overtaking lane to the following vehicle initiating a lane change to the overtaking lane.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Figure 1:
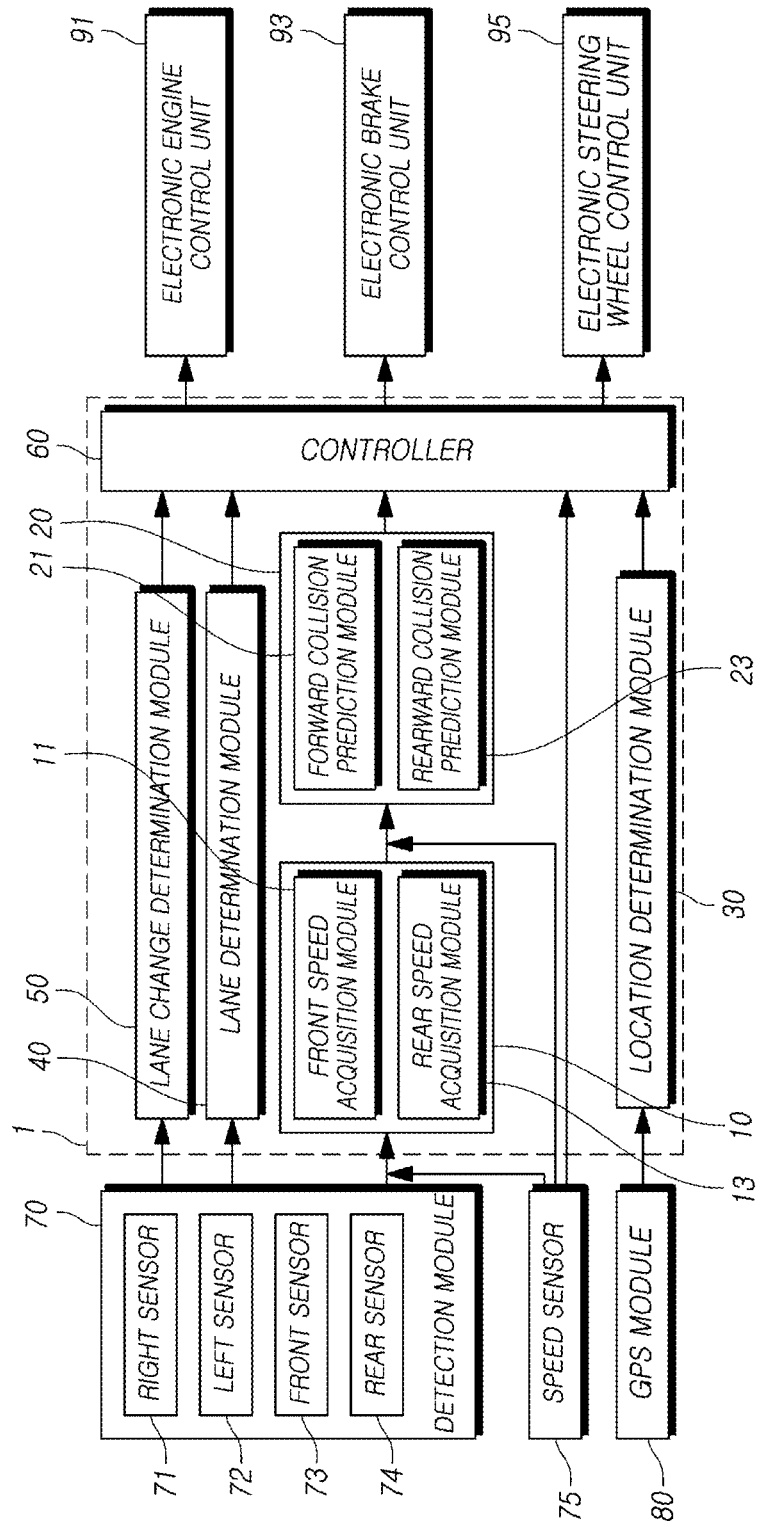
FIG. 1 is a block diagram illustrating a vehicle control apparatus according to some embodiments of the present disclosure.

Hereinafter, the present preferred embodiments of the disclosure will be described in detail with reference to the accompanying drawings. In denoting elements of the drawings by reference numerals, the same elements will be referenced by the same reference numerals although the elements are illustrated in different drawings. In the following description of the disclosure, detailed description of known functions and configurations incorporated herein may be omitted when it may make the subject matter of the disclosure rather unclear.

Terms, such as first, second, A, B, (a), or (b) may be used herein to describe elements of the disclosure. Each of the terms is not used to define essence, order, sequence, or number of an element, but is used merely to distinguish the corresponding element from another element. When it is mentioned that an element is "connected" or "coupled" to another element, it should be interpreted that another element may be "interposed" between the elements or the elements may be "connected" or "coupled" to each other via another element as well as that one element is directly connected or coupled to another element.

Figure 2:
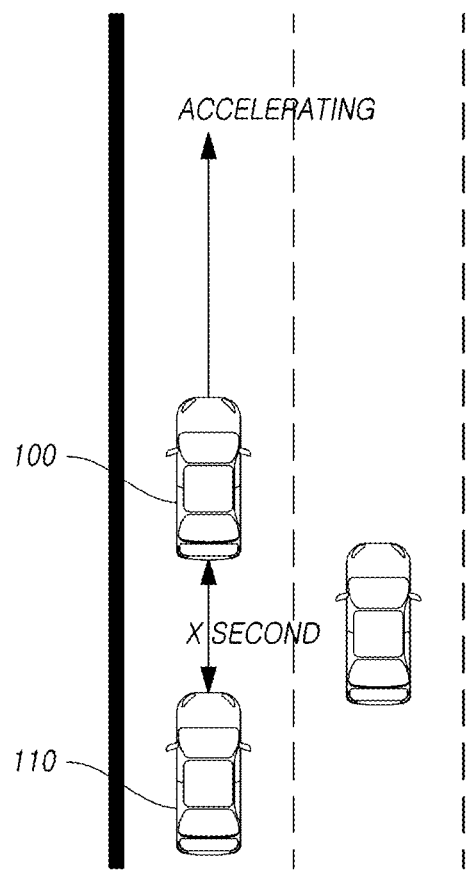
FIG. 2 is a view illustrating a state where the host vehicle equipped with the vehicle control apparatus according to the present disclosure is accelerating to a desired speed.
Figure 3:
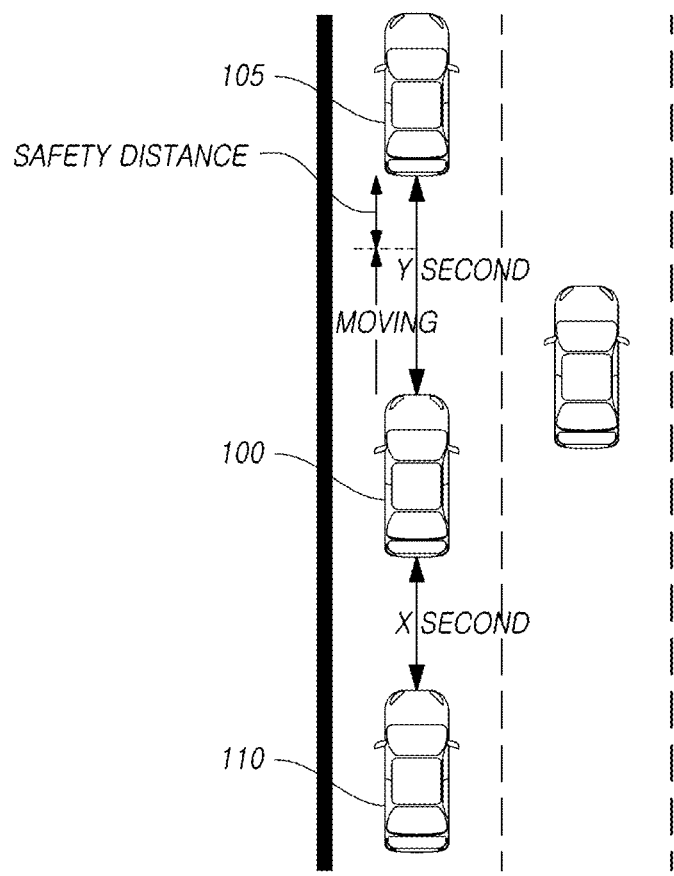
FIG. 3 is a view illustrating a state where the host vehicle equipped with the vehicle control apparatus according to the present disclosure is decelerating to a desired speed.

FIG. 1 is a block diagram illustrating a vehicle control apparatus according to some embodiments of the present disclosure. FIG. 2 is a view illustrating a state where the host vehicle equipped with the vehicle control apparatus according to the present disclosure is accelerating to a desired speed. FIG. 3 is a view illustrating a state where the host vehicle equipped with the vehicle control apparatus according to the present disclosure is decelerating to a desired speed.

A vehicle control system 1 is configured to adjust a traveling speed or braking state of a host vehicle 100 if a potential collision of a following vehicle with the host vehicle is predicted.

The vehicle control system 1 includes a vehicle information acquisition module 10 including a front speed acquisition module 11 configured to calculate a distance from a preceding vehicle 105 and a relative speed between the host vehicle and the preceding vehicle 105 and a rear speed acquisition module 13 configured to calculate a distance from a following vehicle 110 and a relative speed between the host vehicle and the following vehicle, a location determination module 30 configured to determine a location of the host vehicle based on detected results by a GPS module 80, a collision prediction module 20 including a forward collision prediction module 21 configured to calculate a collision estimation time taken to collide with the preceding vehicle and a rearward collision prediction module 23 configured to calculate a collision estimation time taken to collide with the following vehicle 110, a lane determination module 40 configured to determine whether the host vehicle is traveling in an overtaking lane, a lane change determination module 50 configured to determine whether a lane change of the host vehicle is available to a traveling lane, and a controller 60, when a potential collision with the following vehicle is predicted, configured to control a traveling speed or braking state of the host vehicle, determine whether the lane change is necessary or not, and control the lane change if the lane change is available.

A detection module 70 mounted on the vehicle may include a right sensor 71 detecting an object on the right side of the vehicle, a left sensor 72 detecting an object on the left side of the vehicle, a front sensor 73 detecting an object on the front side of the vehicle, and a rear sensor 74 detecting an object on the rear side of the vehicle. The right sensor 71 and the rear sensor 74 may be formed as a single unit, a right-rear sensor, and the left sensor 72 and the rear sensor 74 may be formed as a single unit, a left-rear sensor. In this case, the right-rear sensor is configured to detect objects on the right rear sides of the host vehicle, and the left-rear sensor is configured to detect objects on the left and rear sides of the host vehicle.

Hereinafter, for convenience of description, a description will be given of a case, as an example, in which the right, left, front and rear sensors 71 to 74 are separately provided to the vehicle control system. Each of the right, left, front and rear sensors 71 to 74 may contain one or more sensors. The front sensor 73 and the rear sensor 74 may be mounted on a vehicle's grill, trunk, bumper, etc. and a plurality of the front and/or rear sensors may be mounted at a predetermined interval along the horizontal direction of the grill, the trunk, and/or the bumper.

Meanwhile, each of the right, left, front and rear sensors 71 to 74 may contain at least one of various types of sensors, for example, a radar, a laser sensor, an ultrasonic sensor, and a camera.

In a case where the right, left, front and/or rear sensors 71 to 74 contain the laser sensor or the ultrasonic sensor, it is possible to detect outside objects based on a returned laser beam or ultrasonic wave reflected from the outside objects after a laser beam or ultrasonic wave has been emitted, and to obtain information on distances from the outside objects.

For example, in a case where the laser sensor is used, the laser sensor includes a light emitting portion emitting a laser beam and a light receiving portion receiving a laser beam reflected from other vehicles or an object, and thereby can calculate a moving distance of a laser beam, based on a time difference between the time when the laser beam is emitted from the light emitting portion and the time when the laser beam is received by the light receiving portion after the emitted laser beam has been reflected from a preceding vehicle.

Accordingly, based on a returned laser beam or ultrasonic wave from vehicles or objects on the front and rear sides of the host vehicle 100, it is possible to detect traveling vehicles or objects on the front and rear sides of the host vehicle 100, and traveling vehicles or objects in a left or right lane of the host vehicle. Based on such detected information, a distance between the host vehicle 100 and each of the detected traveling vehicles or objects can be calculated.

Meanwhile, in a case where the front and rear sensors 73 contain a camera, a distance from an object based on an image taken by the camera can be estimated by applying vision techniques.

A speed sensor 75 is a sensor detecting a traveling speed of the host vehicle 100 and uses a reed switch, a hall sensor, a magnetic sensor, etc. With the speed sensor 75, a speed of the vehicle can be detected based on a pulse signal generated by the rotation of a wheel, and information on whether the vehicle is in an idling state or in a traveling state can be obtained. The traveling speed of the host vehicle 100 detected by the speed sensor 75 may be provided to a vehicle information acquisition module 10, a collision prediction module 20, a controller 60 or the like.

The vehicle information acquisition module 10 may calculate a speed of a following vehicle based on the information detected by the right, left and rear sensors 71, 72 and 74, and the speed information of the host vehicle received from the speed sensor 75.

If a preceding vehicle 105 is detected through the front sensor 73, a front speed acquisition module 11 of the vehicle information acquisition module 10 calculates a distance between the host vehicle 100 and the preceding vehicle 105. Thereafter, the front speed acquisition module 11 may calculate a distance between the host vehicle 100 and the preceding vehicle at a predetermined time interval, and thereby calculate variations in distance between the host vehicle 100 and the preceding vehicle with the time, and calculate a relative speed of the preceding vehicle 105 to the host vehicle 100.

If the host vehicle 100 starts to travel, the front speed acquisition module 11 may continuously calculate a distance from an object detected by the front sensor 73 and a relative speed of a preceding vehicle 105, regardless of the traveling and stopping of the host vehicle 100.

Figure 8:
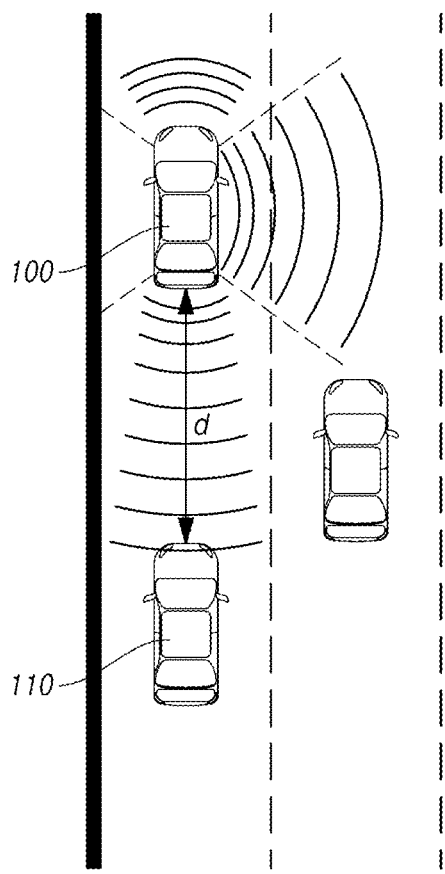
FIGS. 8 and 9 are views illustrating a state where the vehicle control apparatus according to the present disclosure calculates a distance from following vehicles.

If a following vehicle 110 is detected through the rear sensor 74, as illustrated in FIG. 8, a rear speed acquisition module 13 of the vehicle information acquisition module 10 calculates a distance d between the host vehicle 100 and the following vehicle 110. Thereafter, the rear speed acquisition module 13 may calculate a distance between the host vehicle 100 and the following vehicle at a predetermined time interval, and thereby calculate variations in distance between the host vehicle 100 and the following vehicle with the time, and calculate a relative speed of the following vehicle 110 to the host vehicle 100.

The vehicle information acquisition module 10 may transmit the relative speed between the preceding vehicle 105 and the following vehicle 110, the distance between the preceding vehicle 105 and the host vehicle 100, and the distance between the following vehicle 110 and the host vehicle 100 to the controller 60.

A forward collision prediction module 21 of the collision prediction module 20 may calculate a collision estimation time taken to collide with the preceding vehicle based on the relative speed of the preceding vehicle 105 calculated by the vehicle information acquisition module 10 and the distance between the host vehicle 100 and the preceding vehicle 105.

That is, the forward collision prediction module 21 may calculate a collision estimation time at which the preceding vehicle 105 reaches the host vehicle 100, based on the relative speed and distance. The forward collision prediction module 21 may convey the collision estimation time between the host vehicle 100 and the preceding vehicle 105 to the controller 60.

A rearward collision prediction module 23 of the collision prediction module 20 may calculate a collision estimation time taken to collide with the following vehicle using the relative speed of the following vehicle 110 calculated by the vehicle information acquisition module 10 and the distance between the host vehicle 100 and the following vehicle 110. That is, the rearward collision prediction module 23 may calculate an estimation time at which the following vehicle 110 reaches the host vehicle 100, based on the relative speed and distance, and as illustrated in FIG. 2, if the estimation time is lower than or equals to a preset time x, the rearward collision prediction module 23 may determine that a potential collision with the following vehicle 110 is predicted. If the potential collision with the following vehicle 110 is predicted, the rearward collision prediction module 23 may output the related information to the controller 60.

A GPS module 80 provided to the vehicle may obtain location information of the host vehicle 100 based on information collected through communication with a plurality of satellites and output the location information of the host vehicle 100 to a location determination module 30.

The location determination module 30 may determine an actual location of the host vehicle 100 by matching the location information of the host vehicle 100 collected from the GPS module 80 with map information stored in a memory of the host vehicle. Thus, the location determination module 30 can determine whether the host vehicle 100 is located on a straight road, on a curve road, on a stop line such as a pedestrian crossing, at an intersection, or the like. The location determination module 30 may output data on the determined location of the host vehicle 100 to the controller 60.

The location determination module 30 may determine whether the host vehicle 100 is traveling on a highway or not, by matching the location information of the host vehicle 100 collected from the GPS module 80 with the map information stored in the memory. If it is determined that the host vehicle 100 is traveling on a highway, the location determination module 30 may output the related information to the controller 60.

An electronic engine control unit 91 for controlling an engine may include an engine control unit adjusting a fuel injection according to an engine condition and a traveling condition, and a transmission control unit for controlling an automatic transmission. The electronic engine control unit 91 may control a speed of the vehicle according to a control signal from the controller 60.

An electronic brake control unit 93 for braking may control a braking distance of the host vehicle 100 by adjusting brake torque of a hydraulic cylinder used in a hydraulic braking system and a brake motor used in an electronic braking system. The electronic brake control unit 93 causes the host vehicle 100 to stop at a position that the controller 60 has targeted, by adjusting the brake torque of the hydraulic cylinder or the brake motor according to a control signal from the controller.

If it is determined that there is a probability of a potential collision of a following vehicle 110 with the host vehicle 100, based on the information from the speed sensor 75, the vehicle information acquisition module 10, the location determination module 30 and the collision prediction module 20, the controller 60 may accelerate or decelerate the traveling speed of the host vehicle 100 to a target speed if the vehicle is traveling, and control the brake state of the host vehicle 100 if the vehicle is stopping.

If the host vehicle 100 starts to travel, the controller 60 receives the information on a probability of a potential collision of a following vehicle 110 with the host vehicle 100 from the collision prediction module 20. If the potential collision of the following vehicle 110 with the host vehicle 100 is predicted, the controller 60 causes the host vehicle 100 to travel or stop, depending on whether an object is present in front of the host vehicle 100, an actual location of the host vehicle 100, and/or whether the host vehicle 100 is traveling.

The controller 60 may control the traveling speed of the host vehicle 100, depending on whether an object is present in front of the host vehicle 100 or not. As illustrated in FIG. 2, when an object is not present in front of the host vehicle 100, the controller 60 may output a control signal to the electronic engine control unit 91 so that the traveling speed of the host vehicle 100 is accelerated to a target speed. The target speed of the host vehicle 100 may be set to a greater value than that of a following vehicle 110. If the host vehicle 100 is traveling on a highway or an ordinary road, the target speed of the host vehicle 100 may be set to a speed limit of the corresponding highway or road.

As illustrated in FIG. 3, if a vehicle is present within a predetermined distance y in front of the host vehicle 100, the controller 60 may decelerates the traveling speed of the host vehicle 100 to prevent a potential collision between the preceding vehicle 105 and the host vehicle 100. If the potential collision with the preceding vehicle 105 is predicted, the controller 60 may output a command signal to the electronic engine control unit 91 so that the host vehicle 100 travels at a predetermined safety distance from the preceding vehicle 105, and thus cause the traveling speed of the host vehicle 100 to be decelerated.

Meanwhile, the controller 60 may accelerate or decelerate the traveling speed of the host vehicle 100 or control the braking of the host vehicle 100 according to an actual location of the host vehicle 100. The actual location of the host vehicle 100 is obtained from the location determination module 30, and therefore the location determination module 30 may provide the controller 60 with information on whether the host vehicle 100 is located on a straight road, a curve road, a stop line, or an intersection.

According to the information received from the location determination module 30, if the host vehicle 100 is present at a location where an accident may not occur, such as a straight road, a curve road, or the like, even if the traveling speed of the host vehicle 100 is accelerated or decelerated or the brake state thereof is changed, the controller 60 determines that the traveling speed or the brake torque of the host vehicle 100 can be adjusted.

On the other hand, according to the information received from the location determination module 30, in a case where the host vehicle 100 is present at a location where an accident may occur, such as a stop line, an intersection, or the like, if the traveling speed or the brake torque of the host vehicle 100 is changed, the controller 60 does not adjust the traveling speed or the brake torque of the host vehicle 100 even if a potential collision with a following vehicle 110 is predicted.

According to information on whether the host vehicle 100 is traveling or stopping, received from the speed sensor 75, the controller 60 may determine which of the traveling speed and the brake torque can be adjusted. If the host vehicle 100 is traveling, and an object is not present in front of the host vehicle, the controller 60 may output a control signal to the electronic engine control unit 91 so that the traveling speed of the host vehicle 100 is accelerated, and thus a collision between the host vehicle 100 and a following vehicle 110 can be avoided.

However, if a vehicle is present in front of the host vehicle, the controller 60 outputs a control signal to the electronic engine control unit 91 so that the traveling speed of the host vehicle 100 is decelerated, and thus the host vehicle 100 can maintain a safety distance from the preceding vehicle 105, or when a collision with a following vehicle 110 occurs, can avoid a secondary collision with the preceding vehicle 105 or minimize the impact in the secondary collision.

Meanwhile, If the host vehicle 100 is stopping, and a preceding vehicle 105 is not present in front of it, the controller 60 outputs a control signal to an electronic brake control unit 93 so that the brake torque of the host vehicle 100 is minimized. Thus, when a following vehicle 110 collides with the host vehicle 100, the host vehicle 100 can move forward without resistance, and thereby the impact of the collision to a driver and occupants of the host vehicle 100 can be minimized.

However, if an object is present in front of the host vehicle 100, when the following vehicle 110 collides with the host vehicle 100, the controller 60 may output a control signal to the electronic brake control unit 93 so that the host vehicle 100 moves only by a distance for avoiding a collision with an object ahead, and thus the brake torque of the host vehicle 100 may be adjusted. Accordingly, when the collision with the following vehicle 110 occurs, the impact imposed to a driver or occupants of the host vehicle 100 can be mitigated, and a secondary collision with a preceding vehicle 105 can be prevented. Meanwhile, if a preceding vehicle 105 is very close to the host vehicle, the controller 60 may not adjust brake torque of the host vehicle 100 to prevent a secondary collision with the preceding vehicle 105.

According to some embodiments, if the host vehicle 100 is stopping, and a potential collision with a following vehicle 110 is predicted, the controller 60 may calculate an predicted amount of impact occurring when the predicted collision occurs, and an predicted amount of impact occurring when the host vehicle 100 collides with a preceding vehicle 105 due to the collision with the following vehicle 110. According to some embodiments, the calculating of the amount of impact may be performed in consideration of traveling paths, speeds and predicted collision portions of the preceding vehicle 105 and/or the following vehicle 110.

When the host vehicle maintains current brake torque, if it is predicted that an amount of impact resulted from a secondary collision with the preceding vehicle 105 is greater than that of impact resulted from a collision with the following vehicle 110, the controller 60 may increase the brake torque. In case of increasing the brake torque, the controller 60 may compare an increasing value of the amount of impact resulted from a collision with the following vehicle 110 to a decreasing value of the amount of impact resulted from a secondary collision with the preceding vehicle 105. According to some embodiments, the controller 60 may increase the brake torque within a range in which it is predicted that an increasing value of the amount of impact resulted from a collision with a following vehicle 110 is less than a decreasing value of the amount of impact resulted from a secondary collision with a preceding vehicle 105.

On the contrary, when the host vehicle maintains current brake torque, if it is predicted that an amount of impact resulted from a collision with the following vehicle 110 is greater than that of impact resulted from a secondary collision with the preceding vehicle 105, the controller 60 may decrease the brake torque. In case of decreasing the brake torque, the controller 60 may compare a decreasing value of the amount of impact resulted from a collision with the following vehicle 110 to an increasing value of the amount of impact resulted from a secondary collision with the preceding vehicle 105. According to some embodiments, the controller 60 may decrease the brake torque within a range in which it is predicted that an decreasing value of the amount of impact resulted from a collision with a following vehicle 110 is greater than an increasing value of the amount of impact resulted from a secondary collision with a preceding vehicle 105.

These embodiments are examples, and the present disclosure is not limited thereto. The controller 60 may adjust the brake torque so that an amount of impact is reduced by estimating an amount of overall impact imposed on the host vehicle 100.

According to some embodiments, the controller 60 may adjust the brake torque in preference to the initiating of an automatic emergency braking (AEB) of the host vehicle 100. In a case where the host vehicle 100 is equipped with an automatic emergency braking system, if a potential collision with a preceding vehicle 105 is predicted, the vehicle is set to initiate the emergency braking. According to some embodiments, if it is determined that an amount of impact imposed on the host vehicle 100 when the brake torque reduces is smaller than that of impact imposed on the host vehicle 100 when an emergency braking is initiated, the controller 60 may reduce the brake torque of host vehicle 100 in preference to the initiating of an automatic braking.

Figure 4:
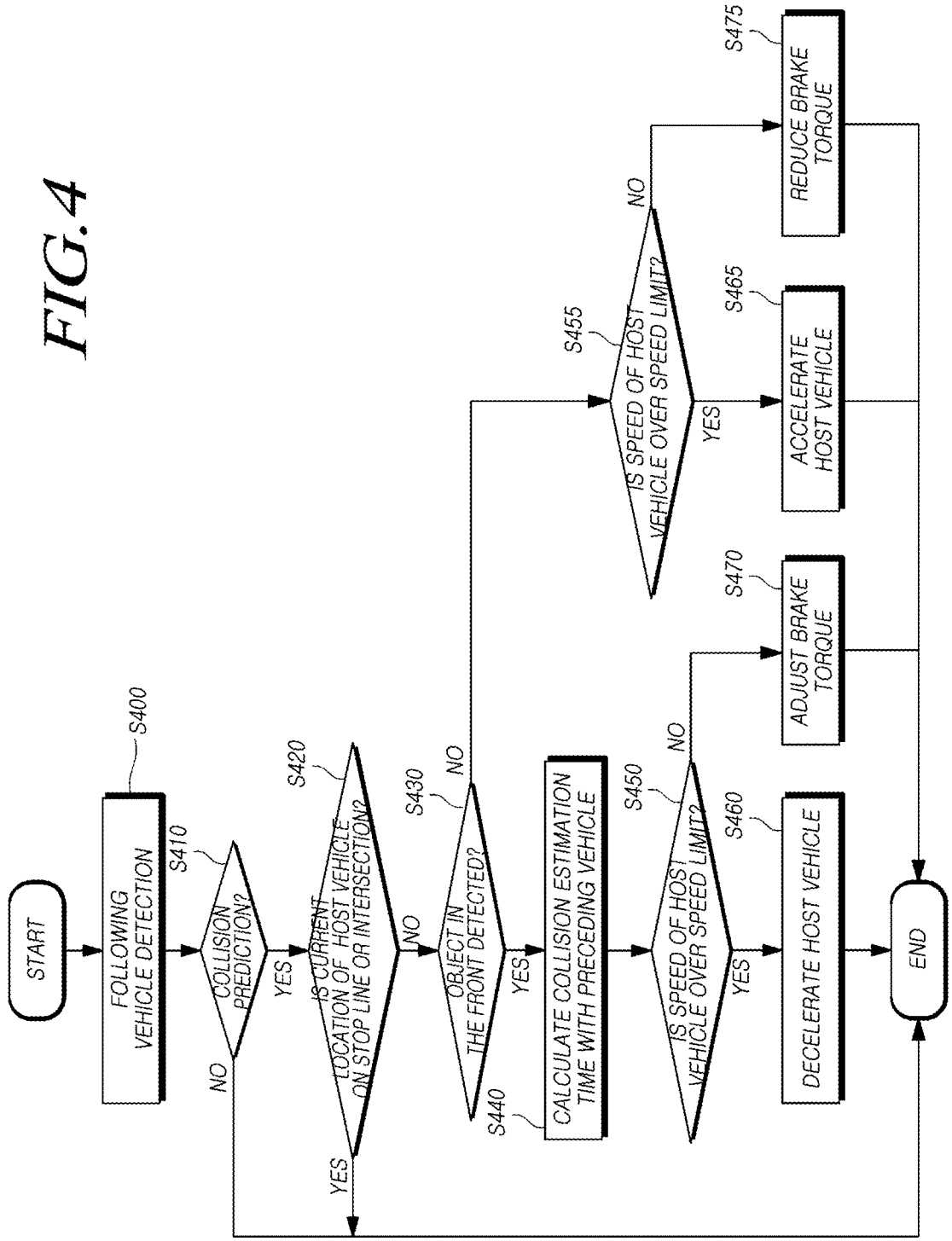
FIG. 4 is a flow chart illustrating a process of adjusting a traveling speed and brake torque of the host vehicle in the vehicle control apparatus according to the present disclosure.

A process of controlling the vehicle control system 1 including such configurations so that a collision with a following vehicle 110 is avoided or impact resulted from the collision is minimized will be discussed below with reference to FIG. 4.

If a vehicle starts to travel and a vehicle control system 1 is operated, a front sensor 73 and a rear sensor 74 detect an object or vehicle in the front and rear of the host vehicle 100 respectively, and a speed sensor 75 measures a traveling speed of the host vehicle 100 and determines whether the host vehicle 100 is traveling or stopping. In addition, a GPS module 80 collects location information of the vehicle and outputs the collected data to a location determination module 30, and then the location determination module 30 determines the location of the host vehicle 100.

If a following vehicle 110 is detected from the rear sensor 74 S400, a rear vehicle information acquisition module 10 can calculate a distance between the following vehicle 110 and the host vehicle 100 and a relative speed of the following vehicle 110. Information on the calculated distance and the relative speed is provided to a collision prediction module 20, and the collision prediction module 20 calculates an estimated time until a collision of the following vehicle 110 with the host vehicle 100 occurs and provides the estimated data to a controller 60.

If a potential collision of the following vehicle 110 with the host vehicle 100 is predicted S410, the controller 60 identifies the location of the host vehicle 100 based on data from the location determination module 30. If the host vehicle 100 is located at a stop line, an intersection, or the like, based on the data from the location determination module 30, even if the potential collision with the following vehicle 110 is predicted, the controller 60 determines to adjust a traveling speed or brake torque of the host vehicle 100 S420-Y.

On the contrary, if the host vehicle 100 is located on a straight road, a curve road, or the like, the controller 60 determines that the traveling speed or the brake torque of the host vehicle 100 is adjustable, and then determines whether an object is present in front of the host vehicle 100 S420-N.

If a potential collision of the following vehicle 110 with the host vehicle 100 is predicted, the controller 60 determines whether an object is present in front of the host vehicle 100 S430, according to results detected by the front sensor.

If an object is not present in front of the host vehicle 100, the controller 60 determines whether the host vehicle 100 is traveling or stopping S455. If the host vehicle 100 is traveling, the controller 60 outputs a control signal to an electronic engine control unit 91 so that the traveling speed of the host vehicle 100 is accelerated, and thus a collision between the host vehicle 100 and a following vehicle 110 can be avoided S465.

On the contrary, if the host vehicle 100 is stopping, the controller 60 outputs a control signal to an electronic brake control unit 93 so that the brake torque of the host vehicle 100 is minimized. Thus, when a collision with a following vehicle 100 occurs, the controller 60 causes the hose vehicle 100 to move forward without resistance S475.

If an object is present in front of the vehicle 100, the vehicle information acquisition module 10 may calculate a distance between a preceding vehicle 105 and the host vehicle 100 and a relative speed of the preceding vehicle 105. Information on the calculated distance and the relative speed is provided to the collision prediction module 20, and then the collision prediction module 20 calculates an estimated time until a collision of the preceding vehicle 105 with the host vehicle 100 occurs and provides the estimated data to the controller 60 S440.

Then, the controller 60 determines whether the host vehicle 100 is traveling or stopping S450. If the host vehicle 100 is traveling, the controller 60 outputs a control signal to the electronic engine control unit 91 so that the traveling speed of the host vehicle 100 is decelerated. Thus, when a collision between the host vehicle 100 and a following vehicle 110 occurs, a secondary collision with a preceding vehicle 105 can be avoided or the impact resulted from the secondary collision can be minimized S460.

On the contrary, if the host vehicle 100 is stopping, the controller 60 outputs a control signal to the electronic brake control unit 93 so that the brake torque of the host vehicle 100 is adjusted to the extent which a collision with the preceding vehicle can be avoided when a collision with the following vehicle 100 occurs S470.

As described above, when the potential collision of the host vehicle 100 with the following vehicle 110 is predicted, if the host vehicle 100 is located in a straight lane or curve path, the vehicle control system 1 according to some embodiments of the present disclosure can avoid a collision with the following vehicle 110 or minimize the impact of a driver or occupants resulted from the collision with the following vehicle 110, by accelerating or decelerating the traveling speed of the host vehicle 100 or braking it, depending on whether the preceding vehicle 105 is detected or not, or the host vehicle 100 is traveling or stopping. Meanwhile, if the host vehicle 100 is located in the intersection or stop line, a secondary accident is prevented as the braking state of the host vehicle 100 is not changed.

FIGS. 5 to 9 are views illustrating a state where a host vehicle equipped with the vehicle control system according to the present disclosure is traveling on a highway.

If it is determined that the host vehicle is traveling on an overtaking lane and a following vehicle is detected, the vehicle control system 1 compares a speed of the host vehicle 100 with that of the following vehicle 110 and causes the host vehicle 100 to perform a lane change from the overtaking lane to a traveling lane.

Referring back to FIG. 1, the lane determination module 40 can determine whether the host vehicle 100 is traveling on an overtaking lane of a highway or not, based on information detected by the left sensor 72. According to some embodiments, the lane determination module 40 can determine whether the host vehicle 110 is traveling on a highway, based on at least one of GPS location information of the host vehicle 110, location information from a navigation system, and utilization information from a high-pass terminal.

Figure 5:
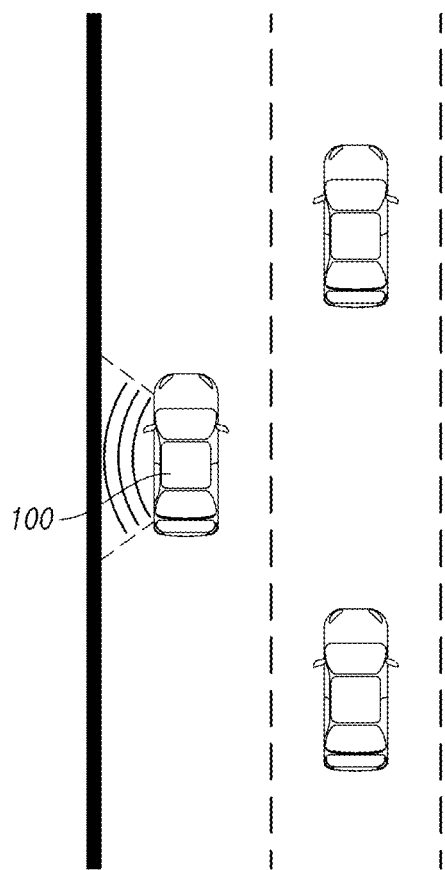
FIG. 5 is a view illustrating a state where the vehicle control apparatus according to the present disclosure detects a center line.

A guard rail or wall can be located for the center line on a highway, and the center line can be located on the left side of the vehicle. As illustrated in FIG. 5, if an object is continuously detected for a preset time through a left sensor 12, the lane determination module 40 may determine an object detected in the left as the guard rail or wall, not a vehicle, and determine that the host vehicle 100 is traveling on an overtaking lane. If it is determined that the host vehicle 100 is traveling on the overtaking lane, the lane determination module 40 can output the determined result to the controller 60.

Meanwhile, the present disclosure can be applied in a region having the center line on the right side of the vehicle, and in this case, the center line can be detected by a right sensor 71.

According to some embodiments, detection information may include obstacle detection information detected from a plurality of radars located on the rear lateral sides of the vehicle. In a case where the obstacle detection information includes information on an obstacle located on the rear lateral side where the driver's seat of the host vehicle 100 is located, if the obstacle is determined to be a stationary object continuously over a set time or a set travel distance, the lane determination module 40 may determine that the host vehicle 100 is traveling on an overtaking lane.

The lane change determination module 50 may determine whether a lane change of the host vehicle is available from the overtaking lane to the traveling lane based on information detected by a front sensor 73, a left sensor 72, a right sensor 71 and/or a rear sensor 74. The lane change determination module 50 determines whether or not the lane change is available to one of the left and right lanes, based on information detected by the respective sensors while the vehicle is traveling.

Figure 6:
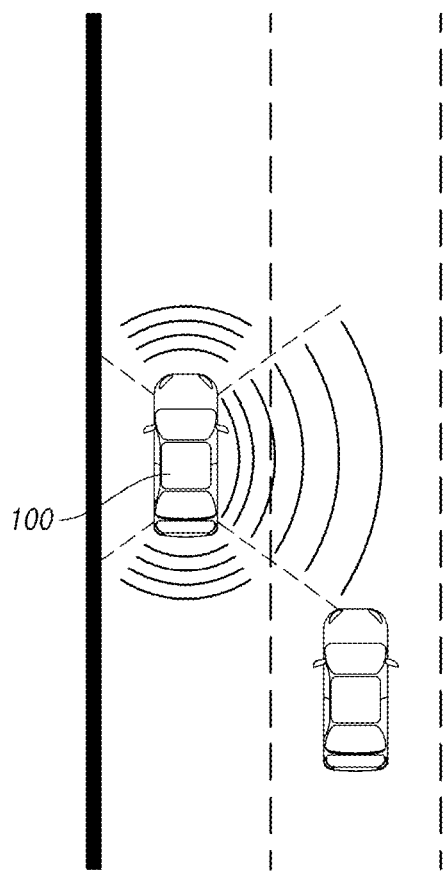
FIGS. 6 and 7 are views illustrating a state where the vehicle control apparatus according to the present disclosure detects vehicles in an adjacent lane to determine whether a lane change is available or not.
Figure 7:
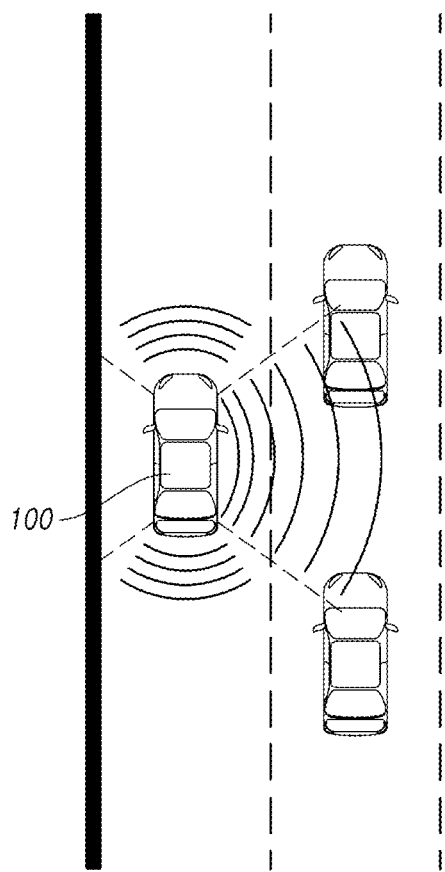

In particular, if it is determined that the host vehicle 100 is traveling on the overtaking lane, by the lane determination module 40, the lane change determination module 50 determines whether or not a lane change is available to the traveling lane located in the right. As illustrated in FIGS. 6 and 7, the lane change determination module 50 may calculate a distance between the host vehicle 100 and a preceding and/or following vehicles 110 in the overtaking lane, and a distance between the host vehicle 100 and a preceding and/or following vehicles 110 in the traveling lane, based on information detected by the front sensor 73, right sensor 71 and rear sensor 74, and then determine whether or not a sufficient space is ensured for the host vehicle 100 to move to the traveling lane.

As illustrated in FIG. 6, if a sufficient space for a lane change is ensured in the driving lane, the lane change determination module 50 may determine that the lane change of the host vehicle 100 is available, and as illustrated in FIG. 7, if a vehicle is detected within a certain distance from the host vehicle 100, the lane change determination module 50 may determine that the lane change thereof is not available.

The lane change determination module 50 may continuously determine whether or not a lane change of the host vehicle 100 is available to the traveling lane while the host vehicle 100 is traveling on the overtaking lane, and then output the determined results to the controller 60.

Meanwhile, in case of a region having the center line on the right side of the vehicle, the traveling lane is located on the left side of the host vehicle 100 and therefore the lane change determination module 50 may determine whether a lane change of the host vehicle is available to the traveling lane located in the left thereof based on information detected by a front sensor 73, a left sensor 72 and a rear sensor 74.

If it is determined that the host vehicle 100 is traveling on the traveling lane based on information from the speed sensor 75, the vehicle information acquisition module 10, the location determination module 30, the lane determination module 40, and the lane change determination module 50, the controller 60 may cause the host vehicle 100 to perform a lane change from the overtaking lane to the traveling lane according to a preset condition.

If it is determined that the host vehicle 100 is traveling on a highway based on information from the location determination module 30, and that the host vehicle 100 is traveling on overtaking lane based on information from the lane determination module 40, the controller 60 compare the speed of the host vehicle 100 obtained from the speed sensor 75 with that of a following vehicle 110 obtained from the vehicle information acquisition module 10. A result of the comparison, if the speed of the following vehicle 110 is greater than that of the host vehicle 100, that is, if the following vehicle 110 is getting closer to the host vehicle 100, the controller 60 may determine that the following vehicle 110 is trying to overtake. Accordingly, the controller 60 may determine a lane change of the host vehicle 100 from the overtaking lane to the traveling lane.

According to some embodiments, if at least one of a case where the speed of the following vehicle 110 is greater than that of the host vehicle 100 and a case where a distance between the host vehicle 100 and the following vehicle 110 is less than or equals to a preset value occurs, the controller 60 may determine a lane change of the host vehicle 100.

Figure 9:
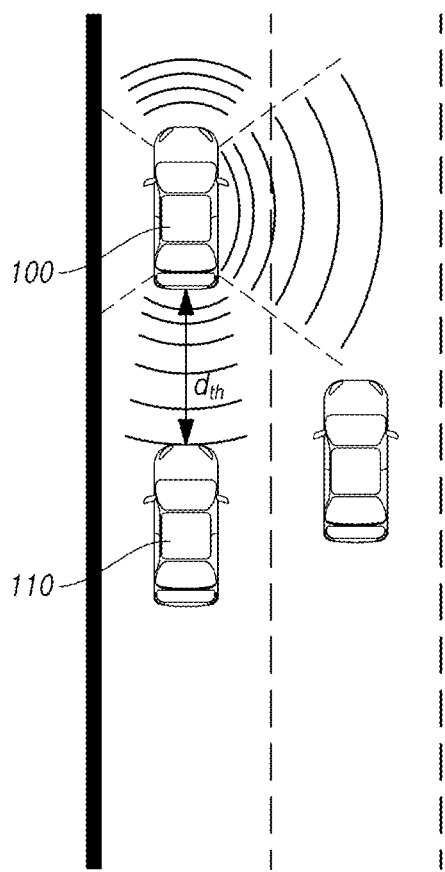

As illustrated in FIG. 9, if the following vehicle 110 reaches the host vehicle 100 within a predetermined distance $d_{th}$, the controller may determine a lane change of the host vehicle 60. In addition, even if the following vehicle 110 not reaches the host vehicle 100 within the predetermined distance, if the speed of the following vehicle 110 is not less than a predetermined value, the controller 60 may determine that there is a probability of a potential collision with the following vehicle 110, and then determine a lane change of the host vehicle 100. For example, if a speed of the following vehicle 110 is higher than a speed limit of the highway, the controller 60 may immediately determine a lane change of the host vehicle 100.

If the lane change is determined, the controller 60 may cause the lane change of the host vehicle 100 to be performed, based on information on whether the lane change of the host vehicle 100 is available to the traveling lane, obtained from the lane change determination module 50. If it is determined that the lane change of the host vehicle is available to the traveling lane by the lane change determination module 50, the controller 60 may output a control signal to an electronic steering wheel control unit 95, and thus cause the steering wheel to be controlled.

Meanwhile, if it is determined that the lane change of the host vehicle 100 is not available to the traveling lane by the lane change determination module 50, the controller 60 may wait a predetermined amount of time until the lane change is available and then cause the lane change to be performed. In addition, if the lane change is not available by the lane change determination module 50, the controller 60 may determine whether or not a vehicle is located in front of the host vehicle 100, and, if a vehicle is not present in the front or a vehicle is spaced apart over a predetermined distance, cause the host vehicle 100 to be accelerated.

At this time, the controller 60 may output a control signal to the electronic engine control unit 91 so that the speed of the vehicle can be controlled.

If the speed of the host vehicle 100 is lower than a speed limit of the highway, the controller 60 may output a control signal setting a speed limit of the highway as a target speed of the host vehicle 100, and then the electronic engine control unit 91 may control the engine of the vehicle according to the target speed. Meanwhile, if the speed of the host vehicle 100 is greater than a speed limit of the highway, the controller 60 may output a control signal to the electronic engine control unit 91 so that the host vehicle 100 travels at a predetermined speed over the speed limit of the highway for only a predetermined period of time. The controller 60 may output a control signal setting a target speed to the electronic engine control unit 91 so that the host vehicle 100 accelerates more than the speed of a following vehicle 110.

While the vehicle is being accelerated, the controller 60 monitors the detected results from the lane change determination module 50, and, if it is determined that a lane change is available to the traveling lane by the lane change determination module 50, outputs a control signal for a lane change to the electronic steering wheel control unit 95. Accordingly, the lane change of the host vehicle 100 may be performed from the overtaking lane to the traveling lane.

In addition, if the lane change of the host vehicle 100 is determined, the controller 60 may notify the driver that the lane change is to be performed through an instrument panel, a navigation system, an audio or voice output unit, or the like.

Figure 10:
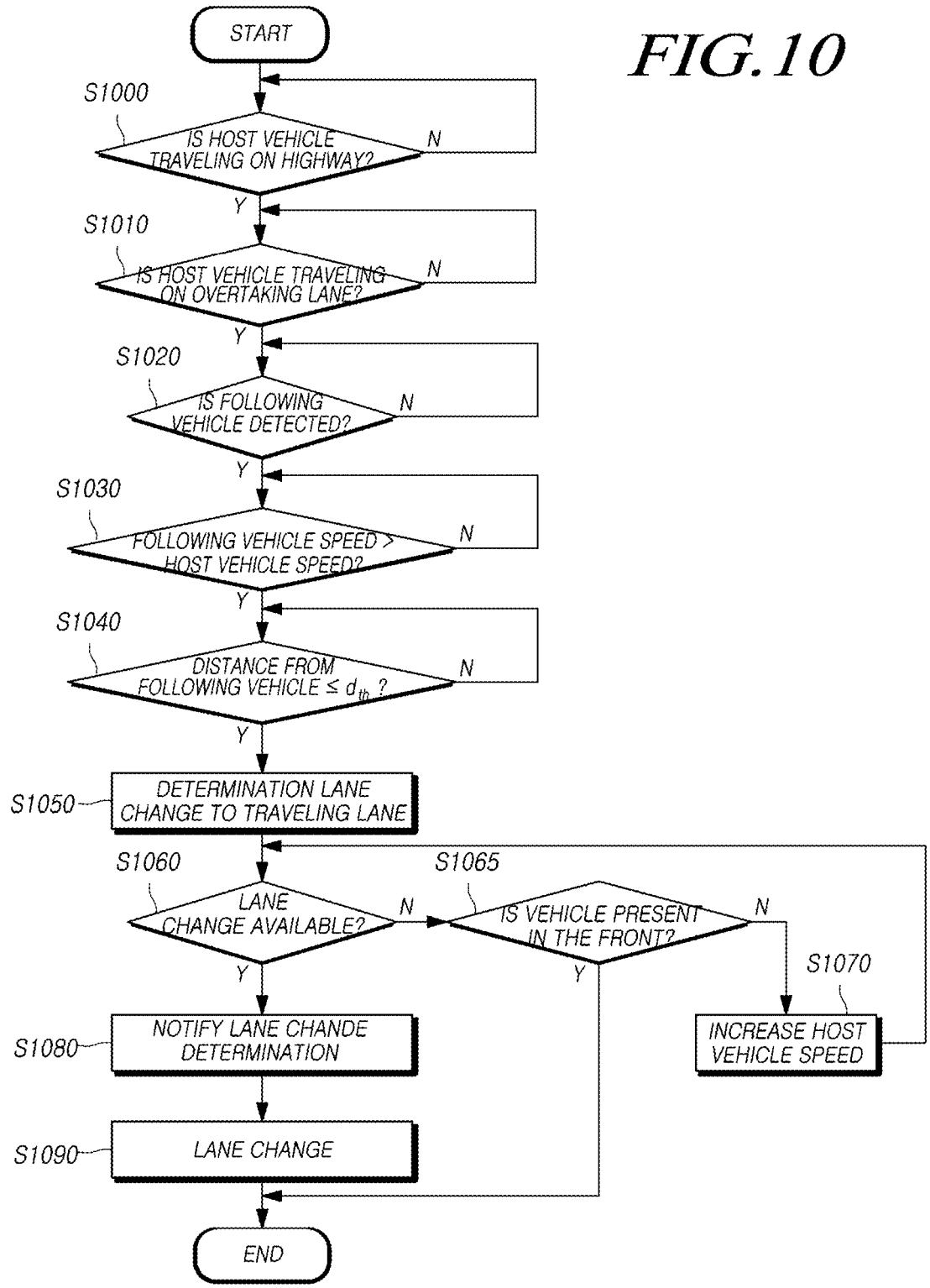
FIG. 10 is a flow chart illustrating a process of performing a lane change from an overtaking lane to a traveling lane by the vehicle control apparatus according to the present disclosure, through the detection of the following vehicle.

Hereinafter, a process of controlling the lane change of the host vehicle 100 from an overtaking lane to a traveling lane in the vehicle control system 1 with such a configuration will be described with reference to FIG. 10.

If a vehicle is started and the vehicle control system 1 is activated, the GPS module 80 collects location information of the vehicle and outputs the collected information to the location determination module 30. If the location determination module 30 determines that the host vehicle 100 is traveling on a highway S1000 based on location information and map information, the lane determination module 40 can determine whether the host vehicle 100 is traveling on an overtaking lane S1010 by determining whether a guard rail or a wall is located in the left of the host vehicle 100, according to the results detected by a left sensor 72 and a rear sensor 74.

If the host vehicle 100 is traveling on an overtaking lane, the lane change determination module 50 may determine whether a lane change of the host vehicle 100 is available from the overtaking lane to the traveling lane based on results detected by the right sensor 71, the front sensor 73 and the rear sensor 74. The lane change determination module 50 may continuously determine whether or not a lane change of the host vehicle 100 is available to the traveling lane while the host vehicle 100 is traveling on the overtaking lane.

If a following vehicle 110 is located according to the information from the left sensor 72, the right sensor 71 and the rear sensor 74 S1020, the vehicle information acquisition module 10 may measure a distance from the following vehicle 110 at a regular time interval, calculate a relative speed of the following vehicle 110, and calculate a speed of the following vehicle 110 based on the speed of the host vehicle 100 detected by the speed sensor 75 and the relative speed of the following vehicle 110.

While the host vehicle 100 is traveling on the overtake lane of the highway, if a following vehicle 110 is detected on the overtaking lane, the controller 60 may compare between the speed of the host vehicle 100 from the speed sensor 75 and the speed of the following vehicle 110 from the vehicle information acquisition module 10, and determine a lane change of host vehicle 100.

At this time, in a case where the speed of the following vehicle 110 is greater than that of the host vehicle 100 S1030, if the following vehicle 110 reaches the host vehicle 100 within a predetermined distance dth S1040, the controller 60 may determine a lane change of the host vehicle 100 from the overtaking lane to the traveling lane S1050. In addition, if the speed of the following vehicle 110 is greater than or equals to a predetermined value, for example a speed limit of the highway, the controller 60 may cause the lane change of the host vehicle to be performed.

If the lane change is determined, the controller 60 may control the lane change to be performed based on results determined by the lane change determination module 50. If it is determined that the lane change is available by lane change determination module 50 S1060, the controller 60 may notify the driver of the host vehicle 100 that the lane change is to be performed S1080, and output a control signal related to the lane change of the host vehicle 100 to electronic steering wheel control unit 95, and then the lane change can be performed S1090.

Meanwhile, if the lane change of the host vehicle 100 is not available according the information of the lane change determination module 50, the controller 60 may wait for a predetermined amount of time until the lane change is available or, if a vehicle is not located in front of the host vehicle 100 or a vehicle is spaced apart over a predetermined distance S1065, increase the distance from the following vehicle 110 by accelerating the host vehicle 100 S1070. Thereafter, when the lane change of the host vehicle 100 is available, the controller 60 may output a control signal related to the lane change of the host vehicle 100 to the electronic steering wheel control unit 95 so that the lane change is performed.

As described above, in a case where the host vehicle 100 is traveling on the overtaking lane of the highway, if a speed of the following vehicle 110 is greater than that of the host vehicle 100, the vehicle control system 1 according to some embodiments of the present disclosure determines that the following vehicle 110 is trying to overtake, and causes the lane change of the host vehicle 100 to be performed from the overtaking lane to the traveling lane. Accordingly, inconvenience of the following vehicle 110 or highway congestion resulted from unsafe driving practices of the driver of the host vehicle 100 can be prevented.

The standardized specifications or standard documents related to the embodiments described above have been omitted in order to simplify the description but constitute a part of the present disclosure. Accordingly, it should be construed that the incorporation of the content of the standardized specifications and part of the standard documents into the detailed description and claims is included within the scope of the present disclosure.

The features, structures, configurations, and effects described in the present disclosure are included in at least one embodiment but are not necessarily limited to a particular embodiment. A person skilled in the art can apply the features, structures, configurations, and effects illustrated in the particular embodiment embodiments to another one or more additional embodiment embodiments by combining or modifying such features, structures, configurations, and effects. It should be understood that all such combinations and modifications are included within the scope of the present disclosure although the exemplary embodiments have been described for illustrative purposes, a person skilled in the art will appreciate that various modifications and applications are possible without departing from the essential characteristics of the present disclosure. For example, the specific components of the exemplary embodiments may be variously modified. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method of controlling a host vehicle comprising:
detecting, by one or more sensors, an object around the host vehicle;
calculating a distance from a following vehicle if the following vehicle is detected on a rear side of the host vehicle;
determining whether a lane change of the host vehicle is available or not according to presence or non-presence of the object around the host vehicle;
in response to a determination that the distance from the following vehicle is less than a predetermined distance, the lane change of the host vehicle is not available, and no preceding vehicle is detected in front of the host vehicle within a predetermined range, determining whether a traveling speed of the host vehicle is lower than a speed limit for a road, which the host vehicle is traveling on, before the traveling speed of the host vehicle is increased by a control signal, and generating, by a controller, the control signal of increasing the traveling speed of the host vehicle to a target speed without changing the lane, wherein the target speed is set to the speed limit for the road, which the host vehicle is traveling on, when the traveling speed of the host vehicle is lower than the speed limit for the road, which the host vehicle is traveling on, before the traveling speed of the host vehicle is increased by the control signal, and the target speed is set to a predetermined speed, which is higher than the speed limit for the road that the host vehicle is traveling on, for a predetermined time when the traveling speed of the host vehicle is higher than the speed limit for the road, which the host vehicle is traveling on, before the traveling speed of the host vehicle is increased; and while the traveling speed of the host vehicle is being increased to the target speed by the control signal, in response to a determination that the lane change of the host vehicle is available, generating, by the controller, a control signal of performing the lane change of the host vehicle.

2. The method of claim 1, further comprising:
determining a location of the host vehicle based on location information of the host vehicle received from a GPS module, and
if the host vehicle is located on a stop line or an intersection, maintaining a current traveling speed or current brake torque of the host vehicle.

3. The method of claim 1, further comprising:
if the preceding vehicle is detected in front of the host vehicle within another predetermined range, calculating a distance from the preceding vehicle and a relative speed of the preceding vehicle; and
predicting a probability of a potential collision of the preceding vehicle with the host vehicle using the distance from the preceding vehicle and the relative speed of the preceding vehicle; and
in response to the predicted probability of the potential collision of the preceding vehicle, increasing or decreasing the traveling speed of the host vehicle or adjusting a brake torque of the host vehicle, according to the distance from the preceding vehicle and the relative speed of the preceding vehicle and the predicted probability of the potential collision of the preceding vehicle with the host vehicle.

4. The method of claim 1, further comprising:
determining whether the traveling speed of the host vehicle is higher than the speed limit, and
generating the control signal of increasing the traveling speed of the host vehicle if the traveling speed of the host vehicle is higher than the speed limit, a traveling speed of the following vehicle is higher than the traveling speed of the host vehicle, no preceding vehicle is detected in front of the host vehicle within the predetermined range, the distance from the following vehicle is less than the predetermined distance, and the lane change of the host vehicle is not available.

5. The method of claim 1, further comprising controlling to decrease the traveling speed of the host vehicle in response to a determination that the traveling speed of the host vehicle is higher than another predetermined speed and the preceding vehicle is located in front of the host vehicle within another predetermined range.

6. The method of claim 1, further comprising, if the traveling speed of the host vehicle is lower than another predetermined speed and the following vehicle collides with the host vehicle, adjusting, by the controller, a brake torque of the host vehicle so that the host vehicle can stop at a distance such that the host vehicle cannot cause a secondary collision with the preceding vehicle.

7. The method of claim 1, further comprising:
if the traveling speed of the host vehicle is lower than another predetermined speed, calculating a first amount of potential impact that will be caused by a collision of the following vehicle with the host vehicle and a second amount of potential impact that will be caused by a collision of the host vehicle with the preceding vehicle, and
if the second amount of the potential impact from the collision of the preceding vehicle is greater than the first amount of the potential impact with the collision of the following vehicle, controlling, by the controller, the vehicle to increase a brake torque.

8. The method of claim 1, further comprising:

if the traveling speed of the host vehicle is lower than another predetermined speed, calculating a first amount of potential impact that will be caused by a collision of the following vehicle with the host vehicle and a second amount of potential impact that will be caused by a collision of the host vehicle with the preceding vehicle, and if the second amount of the potential impact from the collision of the preceding vehicle is less than the first amount of the potential impact with the collision of the following vehicle, the controlling, by the controller, the vehicle to decrease a brake torque.

9. The method of claim 1, further comprising:

detecting whether the host vehicle is traveling on an overtaking lane of a highway, wherein the determining whether the lane change of the host vehicle is available or not is performed if the host vehicle is traveling on the overtaking lane of the highway, and determines whether the lane change of the host vehicle is available or not using at least one of the distance from the following vehicle and a relative speed of the following vehicle.

10. The method of claim 9, wherein the detecting whether the host vehicle is traveling on the overtaking lane of the highway comprises determining whether the host vehicle is traveling on the highway based on at least one of location information of the host vehicle, and location information from a navigation system.

11. The method of claim 9, wherein the detecting whether the host vehicle is traveling on the overtaking lane of the highway comprises detecting whether the host vehicle is traveling on the overtaking lane of the highway based on detection information including obstacle detection information detected by a plurality of radars located on rear lateral sides of the host vehicle, wherein the method comprises, in a case where the obstacle detection information is information on an obstacle located on a rear lateral side where the driver's seat of the host vehicle is located, if the obstacle is determined to be a stationary object continuously over a set time or a set travel distance, determining that the host vehicle is traveling on the overtaking lane.

\* \* \* \* \*